Oct. 9, 1928.   1,686,914
J. KIRKEBY
AUTOMATIC GEAR SHIFTING DEVICE
Filed Sept. 22, 1927    2 Sheets-Sheet 1

INVENTOR
John Kirkeby

Oct. 9, 1928.

J. KIRKEBY 1,686,914

AUTOMATIC GEAR SHIFTING DEVICE

Filed Sept. 22, 1927   2 Sheets-Sheet 2

INVENTOR
John Kirkeby

Patented Oct. 9, 1928.

1,686,914

UNITED STATES PATENT OFFICE.

JOHN KIRKEBY, OF SAN LUIS OBISPO, CALIFORNIA.

AUTOMATIC GEAR-SHIFTING DEVICE.

Application filed September 22, 1927. Serial No. 221,213.

My invention relates to improvements in automatic gear shifting and the objects of my improvement are to provide in connection with my previous Patent No. 1,391,193 a new and simpler operating mechanism for the shifting cam of same. A further object is to use the forward stroke of the clutch pedal to rotate the cam one quarter turn to neutralize the gears and the return stroke to rotate the cam still another quarter turn to engage the gear selected by the operator.

I accomplish these objects by the means illustrated in the accompanying drawings in which—

Figure 1:
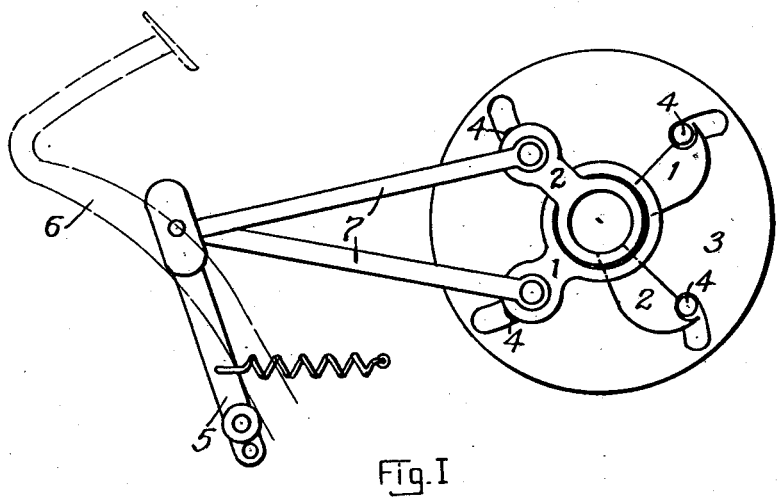
Figure 1 shows a side elevation of the principal parts of my mechanism with the clutch pedal depressed to the limit.
Figure 2:
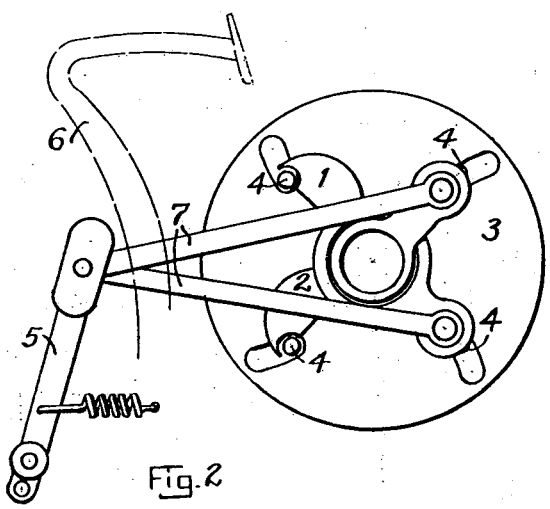
Figure 2 shows a side elevation of the same mechanism with the clutch pedal released or in the most rearward position.
Figure 3:
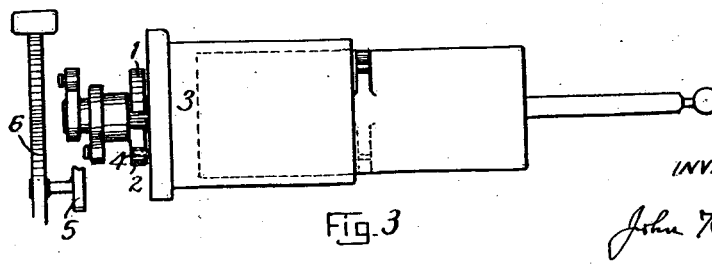
Figure 3 shows a rear view of the principal rotating parts of the whole gear shifting mechanism including the shifting cam, also showing the clutch pedal.
Figure 4:
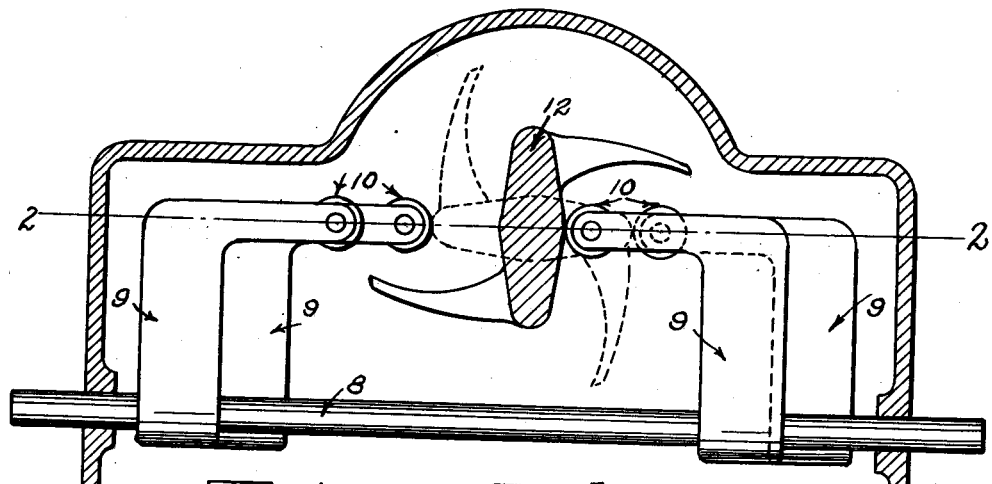
Figure 4 shows a longitudinal section on the line 1—1 of Figure 5.
Figure 5:
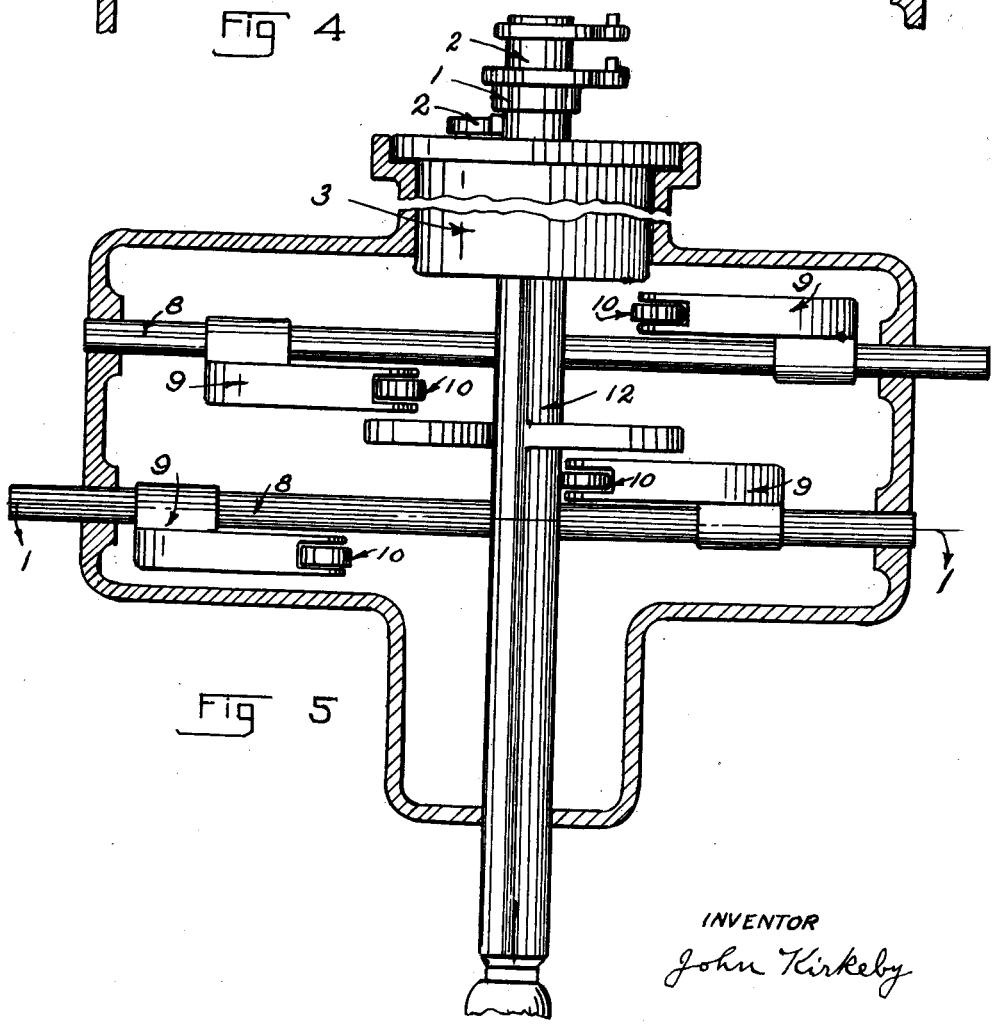
Figure 5 shows a section on line 2—2 of Figure 4.

In Figures 4 and 5 the numeral 8 indicates the conventional shifting rods which are a part of practically all sliding gear transmission gear-sets used in automobiles. Fixed on the said rods 8 are the arms 9, with the rollers 10 mounted therein. Mounted in the clutch pedal side of the case containing the whole mechanism is the rotatable drum 3, into which the cam 12 slides by means of a lever provided on a quadrant on the steering wheel of the automobile.

The arms 9 are set so that the rollers just clear the cam at its longitudinal diameter, as shown by the dotted line in Figure 4. The cam in this position sets all the said rollers to neutral. The projecting fingers are adapted to engage any one of the rollers as the cam is moved so as to bring the finger in line with the roller selected.

Parts 1 and 2 are cams or dogs working on a common center; the shaft of 1 being hollow and forming the bearing for 2.

In the drum 3 are four pawls indicated by numerals 4, which are so arranged as to be engaged by cams 1 and 2, on every quarter turn of said cams 1 and 2.

Cams 1 and 2 are each rocked forward and backward one quarter turn at each full double stroke of the clutch pedal, being each connected to the follower 5 of the clutch pedal 6 by means of connecting links 7. This gives the shifting cam a total of one half turn, which first neutralizes the gears and then again engages them.

By means of this mechanism it is possible to use the selector lever in the same manner as the shift lever now in use, as the cam may be moved either before, after or during shifting to neutral.

I claim:

In the gear shifting device described, the operating mechanism comprising two opposed dogs or cams adapted to be rocked from a common center, means for rocking said cams one quarter turn in each direction by the movement of the clutch pedal, four ratchets disposed to engage alternately by the forward and backward movement of said dogs, whereby the shifting cam is revolved, first one quarter turn to neutralize the gears and the next quarter turn to engage the gear selected by the operator.

In testimony whereof I hereby affix my signature.

JOHN KIRKEBY.